United States Patent
Korn et al.

(10) Patent No.: US 9,562,769 B2
(45) Date of Patent: *Feb. 7, 2017

(54) METHOD FOR LOCATING A VEHICLE

(71) Applicant: Korn Harris, Richmond Hill (CA)

(72) Inventors: Harris Korn, Richmond Hill (CA);
Chris Chaggares, Oshawa (CA)

(73) Assignee: Harris Kohn, Richmond Hill (CA)

(*) Notice: Subject to any disclaimer, the term of this patent is extended or adjusted under 35 U.S.C. 154(b) by 102 days.

This patent is subject to a terminal disclaimer.

(21) Appl. No.: 14/035,588

(22) Filed: Sep. 24, 2013

(65) Prior Publication Data
US 2014/0136103 A1 May 15, 2014

Related U.S. Application Data

(60) Continuation of application No. 13/301,434, filed on Nov. 21, 2011, now Pat. No. 8,560,222, which is a division of application No. 12/665,829, filed as application No. PCT/CA2008/001067 on Jun. 5, 2008, now Pat. No. 8,392,118.

(30) Foreign Application Priority Data

Jun. 21, 2007 (CA) .................................. 2592653
Oct. 10, 2007 (CA) .................................. 2607192

(51) Int. Cl.
*G01C 21/00* (2006.01)
*G08G 1/005* (2006.01)
*G01S 19/48* (2010.01)

(52) U.S. Cl.
CPC ............ *G01C 21/00* (2013.01); *G08G 1/005* (2013.01); *G01S 19/48* (2013.01)

(58) Field of Classification Search
USPC ............................................. 701/2, 36, 491
See application file for complete search history.

(56) References Cited

U.S. PATENT DOCUMENTS

| 5,508,917 A | 4/1996 | Siegle et al. |
| 6,081,206 A | 6/2000 | Kielland |
| 6,321,158 B1 | 11/2001 | Delmore et al. |

(Continued)

FOREIGN PATENT DOCUMENTS

WO  2007083997 A1  7/2007

OTHER PUBLICATIONS

Parking control of an active-joint center-articulated mobile robot based on feedback from beacons; Delrobaei, M.; Mcisaac, K.A.; Electrical and Computer Engineering (CCECE), 2010 23rd Canadian Conference on; Digital Object Identifier: 10.11 09/CCECE.201 0.5575184; Publication Year: 2010, pp. 1-6.

Monocular-vision-based parking assistance for constrained environment; Soon Young Park; Young Sub Song; Jongsik Park; V Hang Joon Kim; Intelligent Transportation Systems (ITSC), 2010 13th International IEEE Conference on; Digital Object Identifier: 10.11 09/ITSC.201 0.5625300; Publication Year: 2010 , pp. 617-622.

(Continued)

*Primary Examiner* — Hussein Elchanti
(74) *Attorney, Agent, or Firm* — McMillan LLP

(57) ABSTRACT

Methods of locating a vehicle are disclosed. Location coordinates are received at regular intervals via a handheld locator device for the current location of the handheld locator device. The handheld locator device detects the cessation of the presence of the vehicle. The location coordinates last-received before the detection of the cessation of the presence of the vehicle are stored automatically, and represent the approximate location of the parked vehicle when the cessation of the presence of the vehicle is detected.

24 Claims, 14 Drawing Sheets

(56) References Cited

U.S. PATENT DOCUMENTS

| | | |
|---|---|---|
| 6,405,125 B1 | 6/2002 | Ayed |
| 6,407,698 B1 | 6/2002 | Ayed |
| 6,489,921 B1 | 12/2002 | Wilkinson |
| 6,650,999 B1 | 11/2003 | Brust et al. |
| 6,791,477 B2 | 9/2004 | Sari et al. |
| RE38,626 E | 10/2004 | Kielland |
| 7,148,802 B2 | 12/2006 | Abbruscato |
| 7,496,445 B2 | 2/2009 | Mohsini et al. |
| 7,522,999 B2 | 4/2009 | Wence et al. |
| 2003/0221118 A1 | 11/2003 | Walker |
| 2005/0200521 A1 | 9/2005 | Rodriguez |
| 2006/0061458 A1* | 3/2006 | Simon et al. .......... 340/426.35 |
| 2008/0106391 A1* | 5/2008 | Santavicca et al. ..... 340/426.36 |
| 2009/0055090 A1 | 2/2009 | Cowley et al. |
| 2010/0318293 A1 | 12/2010 | Brush et al. |

OTHER PUBLICATIONS

Increasing airport security with the development of high accuracy location algorithms based on ray-tracing techniques over WLAN networks; del Corte Valiente, A.; Blanco, O.G.; Pulido, J.M.G.; Electromagnetics in Advanced Applications (ICEAA), 2010 Inter. Conf. on;Digital Object Identifier: 10.11 09/ICEAA.201 0.5652257; Pub. Yr: 2010, pp. 121-124.

Vision-Based Vehicle Detection System With Consideration of the Detecting Location; Cheon, M.; Lee, W.; Yoon, C.; Park, M.; Intelligent Transportation Systems, IEEE Transactions on; vol. PP , Issue: 99; Digital Object Identifier: 10.11 09/TITS.2012.2188630; Publication Year: 2012 , pp. 1-10.

* cited by examiner

METHOD FOR LOCATING A VEHICLE

This application is a continuation of U.S. patent application Ser. No. 13/301,434 filed on Nov. 21, 2011, which is a division of U.S. patent application Ser. No. 12/665,829 filed on Dec. 21, 2009, which is a 371 National Phase of Application No. PCT/CA2008/001067 filed on Jun. 5, 2008, which claims priority from Canadian Patent Application No. 2,592,653 filed on Jun. 21, 2007 and Canadian Patent No. 2,607,192 filed on Oct. 10, 2007. The contents of all of these documents are incorporated herein in their entirety by reference.

FIELD OF THE INVENTION

The present invention relates to the field of locating and tracking devices. In particular, it relates to a system and method for locating a vehicle.

BACKGROUND OF THE INVENTION

One of the difficulties encountered when driving in a large or unfamiliar city is locating and returning to one's vehicle after parking. Particularly in the case of rental vehicles, where both the vehicle and city are unfamiliar to the driver, and with the large size of parking garages in malls, hotels and other venues, it can be very difficult for the driver to not only locate the parked vehicle, but also to determine how to return to the location. However, with the development and increased usage of portable navigation systems, such as GPS tracking and mapping devices, the potential exists to use those systems to assist the driver in locating their vehicle after leaving it parked.

For example, U.S. Pat. Nos. 6,392,592 and 6,694,258 to Johnson et al. ("Johnson") disclose a hand-held car locator device consisting of two parts, a transmitter/receiver in the vehicle, and a fob which is carried by the user. When the user wants to locate the vehicle, they activate the fob, and a signal is sent to the vehicle, which then gets its current location using GPS or similar means, and sends the location back to the fob for the user to see. Johnson also discloses automatic transmission of location to the fob, such as upon locking of the vehicle doors.

Problems with the above-mentioned Johnson patents include the following: it requires that a GPS or similar location tracking unit be located in the vehicle at all times and it requires that the location tracking unit be powered by the vehicle's battery while the vehicle is off, which can present vehicle battery drainage issues. Johnson also requires a fob with (1) transceiver technology, (2) the ability to interpret a signal from a location tracking unit, (3) the ability to display location and/or directional information, and (4) strong transmission signal capabilities—which necessitates a significant power source—in order to effectively contact the tracking unit in the vehicle (as the signal may be issued from a great distance and can be blocked by concrete walls or other such obstructions).

Another example, U.S. Pat. No. 6,407,698 to Ayed ("Ayed") discloses a method of locating a parked vehicle using a sensor incorporated into the vehicle and a mobile GPS device where the sensor is activated when the vehicle is parked and sends a signal to the GPS device. The GPS device then retrieves the current coordinates on receiving the signal from the sensor. The Ayed method requires modification of the vehicle to incorporate the sensor, as well as possession of a separate mobile GPS device by the user. In Ayed, as the location coordinates are not retrieved by the GPS device until the vehicle is parked, there is also the risk of a failure to connect to the GPS satellites in a timely manner, such that the retrieved coordinates do not correspond to the vehicle's parking location.

As with Johnson, Ayed requires a second device to communicate with the GPS device to determine the location of the parked vehicle. Another problem is the need to modify the vehicle to include sensors to indicate to the locator device that the vehicle is parked, or other devices, such as a cradle, to accommodate the locator device.

Additionally, Ayed requires that the sensors installed in the vehicle have sufficient sophistication and complexity to both accurately and consistently note that the vehicle is parked and to then communicate with the GPS device, creating a risk of failure in that the parking of the vehicle may not be detected by the sensor and, as a result, a failure to communicate the signal to the GPS device.

Yet another example is found in U.S. Pat. No. 6,489,921 issued to Wilkinson ("Wilkinson"). The Wilkinson patent discloses a handheld device (i.e. a keychain fob) which senses when it has been moved out of range of an RF signal tag that is mounted on the vehicle's dashboard near the vehicle's ignition. When the user removes the key (and keychain fob apparatus) from the immediate range of the vehicle's ignition, which is likely indicative of the user being in the process of leaving the vehicle, the RF signal is therefore lost. This signal loss automatically prompts the device to initiate the device's GPS receiver to seek satellite signals and, upon securing said signals, to record the device's coordinates. These coordinates, in turn, are meant to correspond to the location of the user's parked vehicle. When re-activated, the device gets the GPS coordinates for its current location, and calculates the shortest distance to the recorded coordinates. It then displays on-screen an arrow indicating the direction the user should travel to get back to the original coordinates. Once the device is back within range of the RF signal, it disengages and waits for the RF signal to drop below threshold again to resume the process.

Problems with Wilkinson include an issue with apparatus size, as Wilkinson expresses a need for an apparatus with locating technology capabilities that is small enough in size and weight to be placed on a key chain (and thus to be in range of the RF tag that is to be placed by the vehicle's ignition).

Wilkinson and Ayed share a common limitation, in that the process for determining the coordinates of the vehicle is not initiated until after the vehicle is parked. Initiating the locating technology after parking creates a significant risk that the coordinates will not be retrieved in a timely fashion, as the device needs time to secure multiple satellite signals in order to determine its location. By the time the device secures the required satellite signals and calculates its location the user may have walked a significant distance from their vehicle, thus significantly limiting the device's ability to secure an accurate determination of the location of the vehicle. This, in turn, largely undermines the purpose and intent of both of these patents.

A further limitation of both Wilkinson and Ayed as a result of not initiating the process of determining coordinates of the vehicle until after it is parked relates to situations in which the user parks in a location where GPS signals are blocked (for example, in an underground or covered parking garage). In this situation, the portable locator device in Ayed reattempts to obtain a GPS signal a fixed number of times before alerting a user that obtaining a location has failed. As for Wilkinson, the locator device beeps if it is unable to determine the location where the vehicle is parked. While these audible warnings may alert the user of an issue, they do not address the issue. That is, the user will not have any location information for the parked vehicle.

U.S. Pat. No. 6,363,324 to Hildebrant, which has two GPS receivers, one in car and another in the handheld device, and discloses a display using a direction arrow and an elevation marker to indicate the direction to a parked vehicle. The Hildebrant receivers retrieve and store the location coordinates once the vehicle is parked. Hildebrant is limited in that two GPS devices are required.

U.S. Pat. No. 6,791,477 and No. 7,068,163, both issued to Sari et al. ("Sari"). The Sari patents disclose a locator device (key "faub" (sic) or wireless telephone) that retrieves a waypoint from a second device in response to a triggering event such as the parking of a vehicle. The waypoint is determined by the second device using coordinates retrieved prior to the triggering event. Sari is limited in that two GPS devices are required, and that the waypoint is transmitted between devices, creating a risk of a corrupted or missed waypoint.

There is a need for a method of locating a vehicle that uses a single GPS device, ideally in a one-step operation that does not require any modification of the vehicle.

There is also a need for a method of locating a vehicle that functions autonomously, enabling the recording of the vehicle's location on a GPS-enabled device without any user intervention and without the requirement for noteworthy modifications to the vehicle. Ideally, such a method would use a device that is unobtrusive and requires minimal or no modification to the vehicle.

There is further a need for a method of locating a vehicle that does not rely on retrieving coordinates after the vehicle is parked, to increase the likelihood of the coordinates being captured and stored in a timely fashion so that the coordinates are in very close proximity to the vehicle's actual location.

It is an object of this invention to partially or completely fulfill one or more of the above-mentioned needs.

SUMMARY OF THE INVENTION

In one aspect of the invention, a method of locating a vehicle is provided, comprising: a) automatically detecting the presence of the vehicle by a removable locator device and, in response, said locator device automatically using locating technology to retrieve, at regular intervals, location coordinates for the current location of said locator device, said location coordinates approximating the location of the vehicle; b) detecting the cessation of the presence of the vehicle which is indicative of the location device moving away from the vehicle and therefore of the vehicle being parked; c) automatically storing, as a waypoint on the locator device, the last location coordinates retrieved prior to sensing said loss of connection; and, d) removing the locator device from the vehicle to enable use of the locator device to return to the stored waypoint, wherein the stored waypoint represents the approximate location of the vehicle. When the user wishes to return to their vehicle, they use the locator device to guide them back to the waypoint representing the approximate location of their vehicle.

The locator device is preferably an electronic device capable of determining or retrieving its location, preferably a device that uses GPS technology, such as a commercial GPS receiver, a cell phone or PDA with a built-in GPS receiver, a cell phone or PDA that is GPS-capable (e.g. has a GPS chipset) or a similar device. Alternatively, the locator device may be a cell phone or PDA that uses an alternate method of locating cell phones such as, but not limited to, cell phone triangulation.

In an alternative embodiment, the locator device emits a signal to confirm the successful recording of the waypoint and to remind users to take the locator device with them when they exit their vehicles.

According to another aspect of the invention, there is provided a system for locating a parked vehicle, comprising a locator device, the locator device being removably coupled to the vehicle and capable of using locating technology to retrieve, at regular intervals, location coordinates for the current location of said locator device, said location coordinates approximating the location of the vehicle, and the locator device including the ability to detect a loss of connection to the vehicle, storing the last retrieve location coordinates as a waypoint approximating the location of the vehicle, and guiding the user back to the waypoint representing the approximate location of their vehicle.

According to another aspect of the invention, there is provided a method of locating a vehicle, comprising: a) placing a beacon device in the vehicle, the beacon device being capable of wireless signal communication according to preset parameters; b) detecting, on a locator device, the presence of the beacon device in the vehicle via the wireless signal; c) automatically initiating and using locating technology in the locator device to establish current location coordinates for the locator device upon detecting the presence of the beacon device; d) using location technology to update the current location coordinates of the locator device at regular intervals for as long as the locator device remains within signal range of the beacon device, the signal range being such that a person would still be within close range of their vehicle (e.g. 10 meters or less) when the locator device was moved out of range of the signal; automatically storing, as a waypoint on the locator device, the last updated location coordinates upon the locator device ceasing to detect the presence of the beacon device, wherein the stored waypoint represents the approximate location of the vehicle. When the user wishes to return to their vehicle, they use the locator device to guide them back to the waypoint representing the approximate location of their vehicle.

The beacon device may communicate with the locator device continuously, or may communicate with the locator device on a periodic basis. The time interval between communications should not exceed the approximate time that it would take a person to walk a distance from his vehicle to a location at which he or she would no longer be fairly easily able to determine the location of his or her vehicle (i.e. 60 seconds). The shorter the signal interval, the more accurately the location of the vehicle will be noted in the locator device and the less effect a signal failure would have on the determination of the vehicle location.

The beacon device and locator device will use a communications technology such as, but not limited to, Bluetooth or RFID as a means to recognize and communicate with one another. The locator device is an electronic device, capable of determining or retrieving its location, preferably a device that uses GPS technology, such as a commercial GPS receiver, a cell phone or PDA with a built-in GPS receiver, a cell phone of PDA that is GPS-capable (e.g. has a GPS chipset) or a similar device. Alternatively, the locator device may be a cell phone or PDA that uses a means for locating cell phones such as, but not limited to, cell phone triangulation or WiMAX.

According to another aspect of the invention, there is provided a system for locating a parked vehicle, comprising:

a) a beacon device that is placed in the vehicle, the beacon device being capable of wireless signal broadcasting according to preset parameters b) a locator device operative to detect the wireless signal of the beacon device, and to automatically initiate and use location technology in the locator device to update its current location for as long as the locator device remains within signal range of the beacon device and to record the last location as a waypoint upon ceasing to detect the wireless signal, wherein the locator device denotes the waypoint as the approximate location of the parked vehicle, and guiding the user back to the waypoint representing the approximate location of their vehicle.

According to a further aspect of the invention, there is provided a method for locating a parked vehicle, comprising: receiving location coordinates at regular intervals, via a handheld locator device, for the current location of said handheld locator device; detecting, via said handheld locator device, the cessation of the presence of said vehicle; and automatically storing said location coordinates last-received before said detection of the cessation of the presence of said vehicle as a waypoint representing the approximate location of said parked vehicle when the cessation of the presence of the vehicle is detected.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of exemplary embodiments. The exemplary embodiments described herein constitute only possible implementations of the described invention and it is recognized that one skilled in the art may be able to devise alternate equivalent embodiments of the invention. The exemplary embodiments are herein below described with reference to the accompanying drawings, in which like numbers refer to like elements, wherein.

DETAILED DESCRIPTION OF THE PREFERRED EMBODIMENTS

Figure 1:
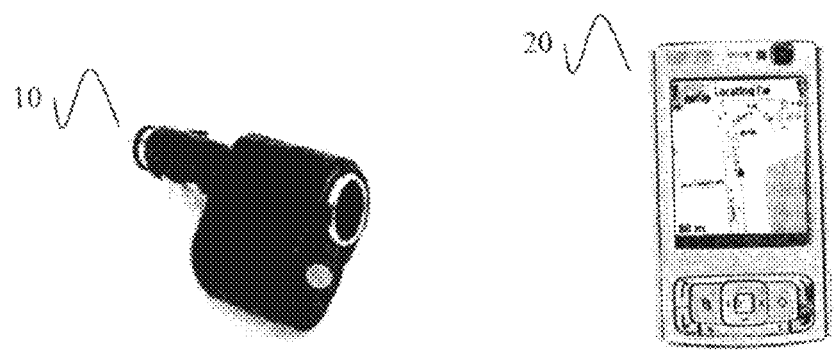
FIG. 1 is an exemplary embodiment of the present invention.

The present inventive system and method comprises a locator device 20, as shown in FIG. 1, which is capable of determining its location (via GPS or other location determining systems), recording a waypoint of its present location, and providing directions to a recorded waypoint from its current location. The locator device 20 is operative in the present invention to automatically set a waypoint approximating the location of a parked vehicle and to enable a user to return to that waypoint, and thus the vehicle, at a later time.

The locator device 20 is preferably an electronic device capable of determining or retrieving its location, preferably a device that uses GPS technology, such as a commercial GPS receiver, a cell phone or PDA with a built-in GPS receiver, a cell phone or PDA that is GPS-capable (e.g. has a GPS chipset) or a similar device. Alternatively, the locator device may be a cell phone or PDA that uses an alternate method of locating cell phones such as, but not limited to, cell phone triangulation.

Figure 2:
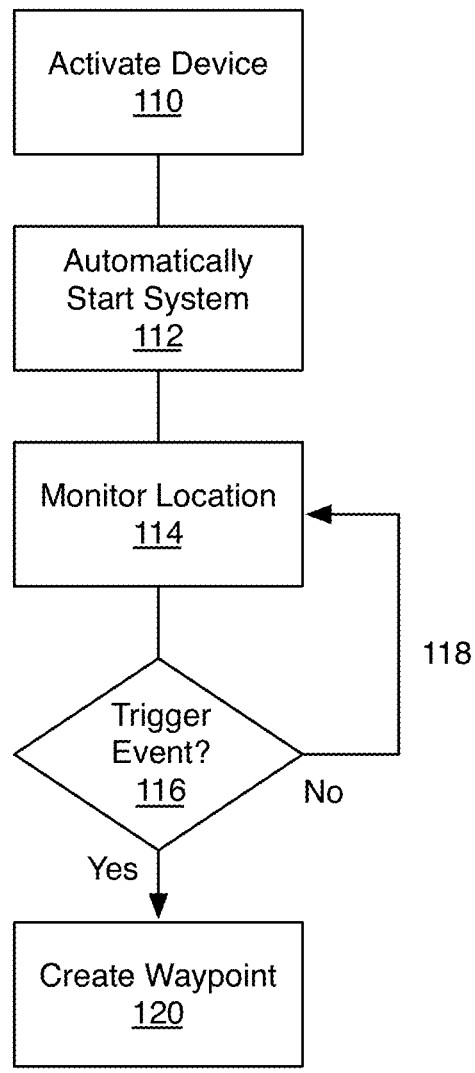
FIG. 2 is a flowchart showing the process for establishing a waypoint approximating a vehicle's location according to the present invention.

As shown in FIG. 2, the locator device 20 is initially activated (step 110) prior to user entering vehicle or while user is in the vehicle. Once activated, the locator device 20 automatically launches the system (step 112), and then regularly determines its present location coordinates (step 114) using GPS or an equivalent location coordinate system. The locator device 20 then monitors (step 116) for a triggering event. If this triggering event is not detected, the process continues (step 118). Once the triggering event is detected, the locator device 20 records a waypoint (step 120) corresponding to the last set of location coordinates. This waypoint then acts as a proxy for the vehicle's location.

Figure 3:
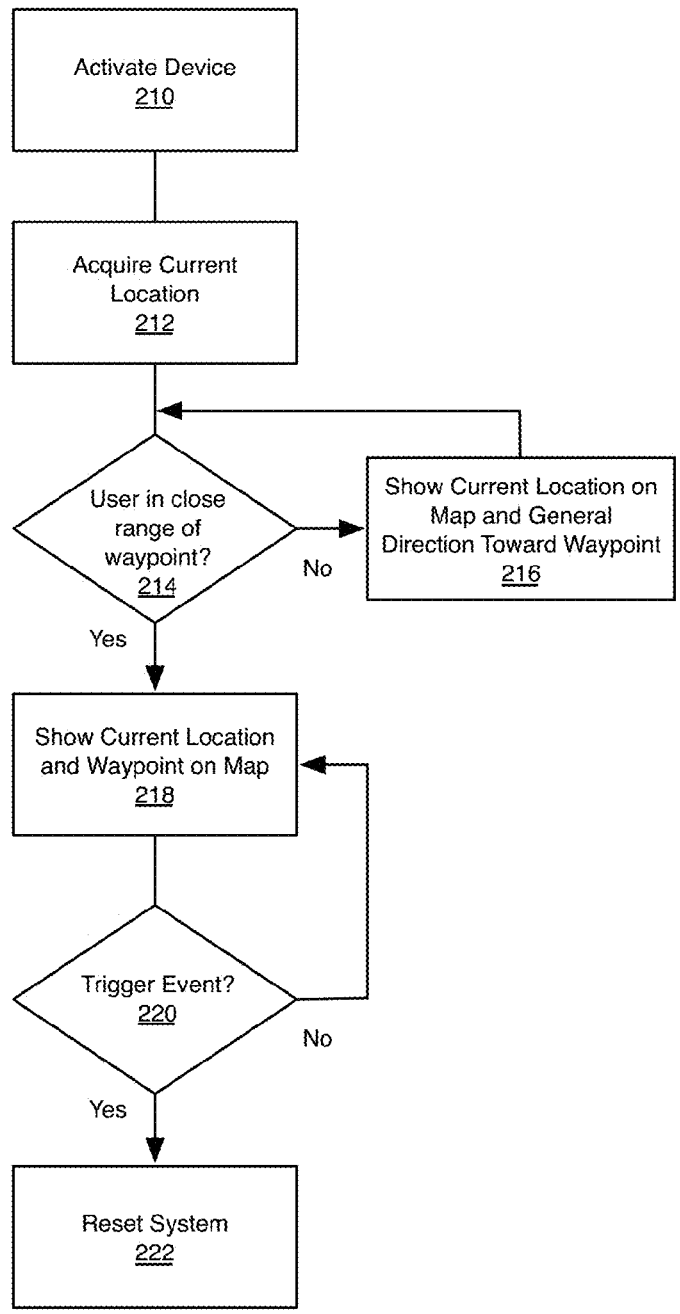
FIG. 3 is a flowchart showing the process for guiding a user to the waypoint established by the process of FIG. 2.

To return to the waypoint, and thus the vehicle, the user follows the steps as shown in FIG. 3. First, the user activates the locator device 20 (step 210) with instructions to return to the established waypoint. The locator device 20 then acquires its current location using GPS or other locating technology (step 212). The locator device 20 displays the user's current location on a graphical map, with the user's current location indicated by a symbol such as a triangle that depicts the direction that the user is walking. The locator device 20 determines if the distance from the user's current location and the vehicle's approximate location is such that these two waypoints can be displayed on a graphical map on the locator device 20 display at the same time (step 214). If both the user's current location and the location of the vehicle can not be displayed on the map at the same time (e.g. the two points are more than 100 meters apart, depending on the scale of the map), then the locator device 20 display shows the user's current location, and also displays an arrow depicting the general direction toward the approximate location of the vehicle (step 216). When the distance to the waypoint is sufficiently reduced such that both the user's location and the waypoint fit on the map scale, the general direction arrow toward the approximate location of the vehicle no longer appears and the waypoint is shown (step 218) by a suitable symbol, such as a car. A second triggering event occurs when the user has returned to the approximate location of their vehicle (step 220), at which point the locator device 20 resets (step 222).

Additionally, or alternatively, the locator device 20 can display a highlighted route on the map from the user's current location to the waypoint representing the approximate location of the parked vehicle. As described, the preferred output device for the locator device 20 is a visual graphic display, however, a text display and/or speakers can also be used as output devices. In combination with, or as an alternative to the map, the user can be provided with a set of text instructions and/or spoken instructions to guide them from their current location to the waypoint. The instructions can be provided as a list (preferred for text instructions), or as needed as the user progresses towards the waypoint (preferred for spoken instructions).

Figure 4:
FIG. 4 is a screen capture off a locator device when the system is on but not in active use.
Figure 5:
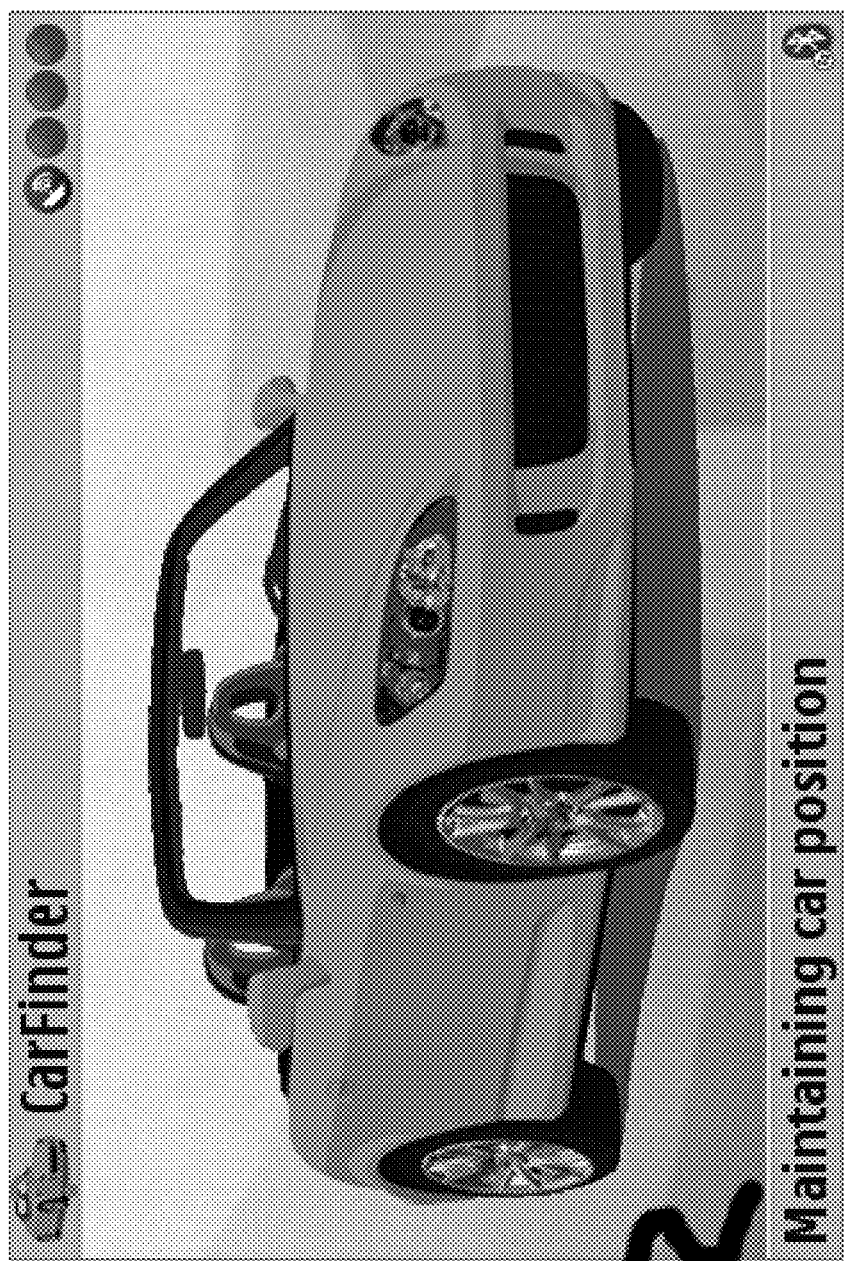
FIG. 5 is a screen capture off a locator device during the location monitoring step.

A series of screen captures from a cellular phone implementation of the present inventions are shown as FIGS. 4-11. In FIG. 4, the locator device 20 is idle, and the location of the vehicle is unknown, as marked by a symbol of a car with a question mark 400. In FIG. 5, the trigger event has occurred, GPS or other locating technology has been initiated, and the locator device 20 proceeds to update and maintain the vehicle's location co-ordinates 500.

Figure 6:
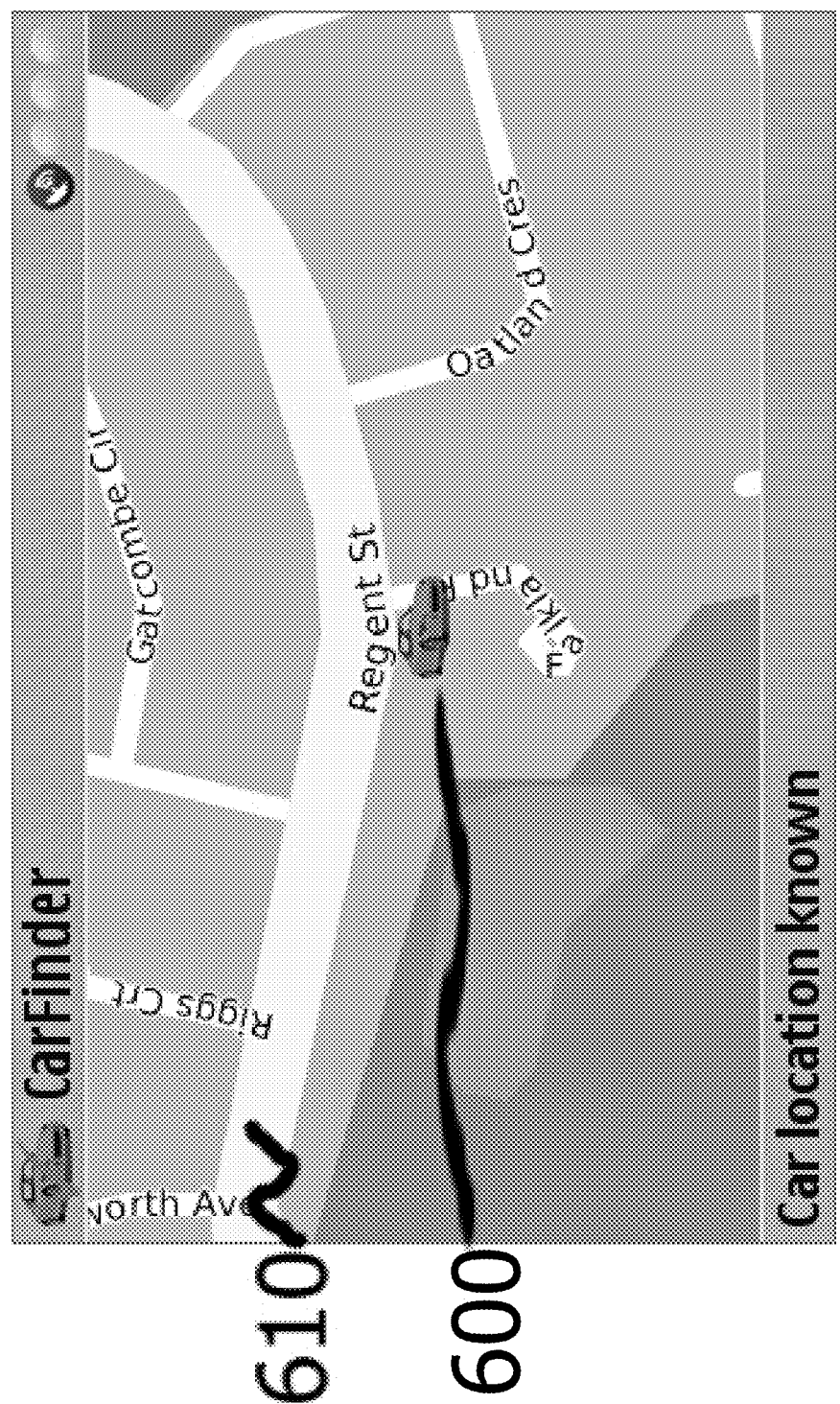
FIG. 6 is a screen capture off a locator device when the trigger event has occurred and the parked vehicle's approximate location has been captured.

In FIG. 6 the trigger event denoting that the user has removed the locator device 20 from the vehicle has occurred, at which point the locator device 20 notes the last known waypoint as the approximate location of the vehicle. The parked vehicle's approximate location is denoted via a symbol (such as a car) 600 on a map of the area around the approximate location of the parked vehicle 610.

Figure 7:
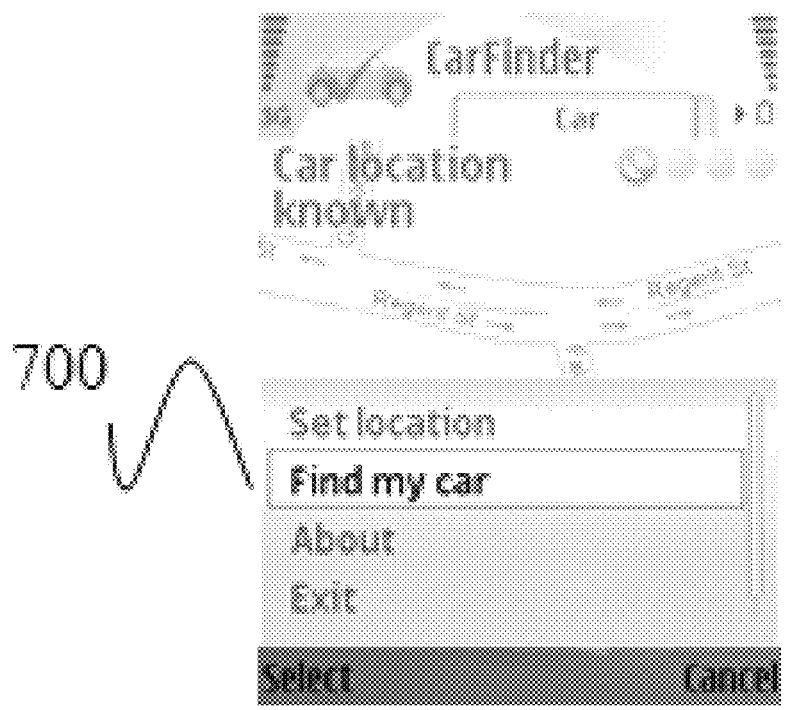
FIGS. 7 and 7a are screen captures off locator devices which relate to when the user prompts the locator device to guide the user back to the approximate location of their parked vehicle.
Figure 7A:
Figure 8:
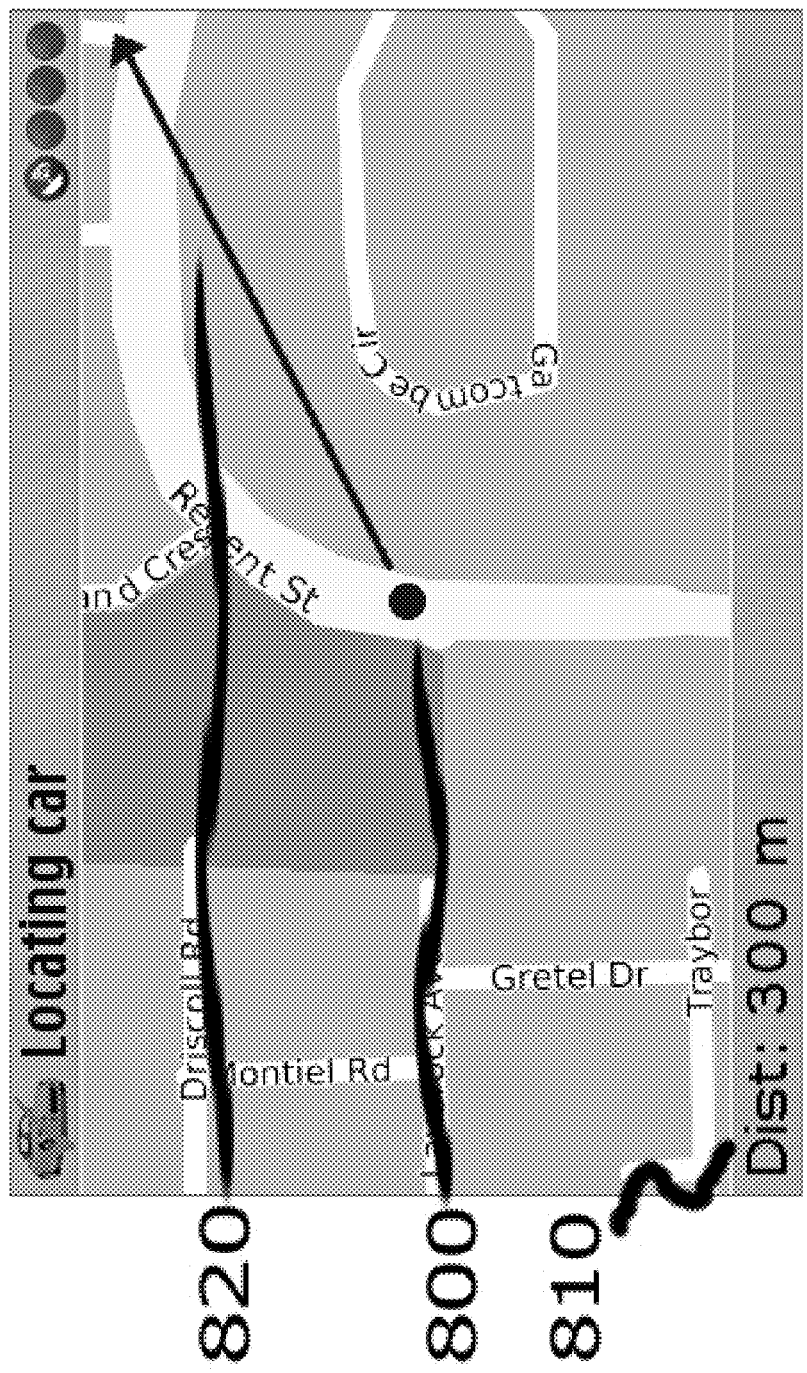
FIG. 8 is a screen capture off a locator device during the return to waypoint phase when the distance between the user's current location and the approximate location of the parked vehicle is significant enough such that the locator device cannot readily be displayed on a map at the same time.

In FIGS. 7 and 7a, the user has activated the locator device 20 and has prompted 700 the locator device 20 to indicate a route to the waypoint representing the approximate location of the parked vehicle. In FIG. 8, the user's location and heading are marked by a triangle 800. As the approximate location of the parked vehicle is a significant distance 810 from the user 800 and is thus located outside the boundaries of the map, a directional graphic 820 is shown indicating the general direction toward the waypoint from the user's position 800.

Figure 9:
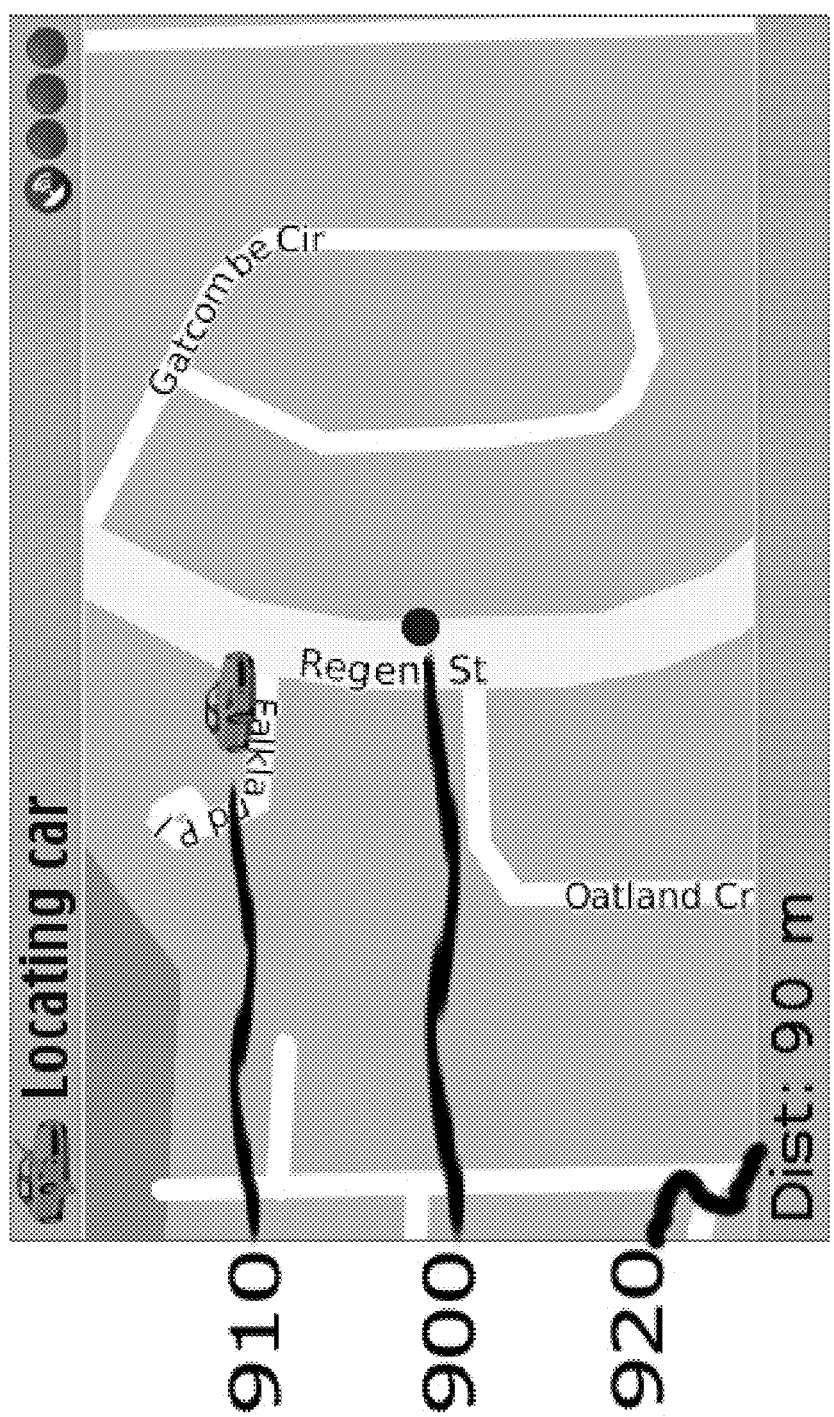
FIG. 9 is a screen capture off a locator device during the return to waypoint phase when the distance between the user is close enough to the approximate location of the parked vehicle such that the locator device can display both of these points on a map at the same time.

As depicted in FIG. 9, when the user 900 and the approximate location of the vehicle 910 are close enough 920 to be on the same map (approximately 100 meters), the directional graphic (FIG. 8, 820) no longer appears on the map.

Figure 10:
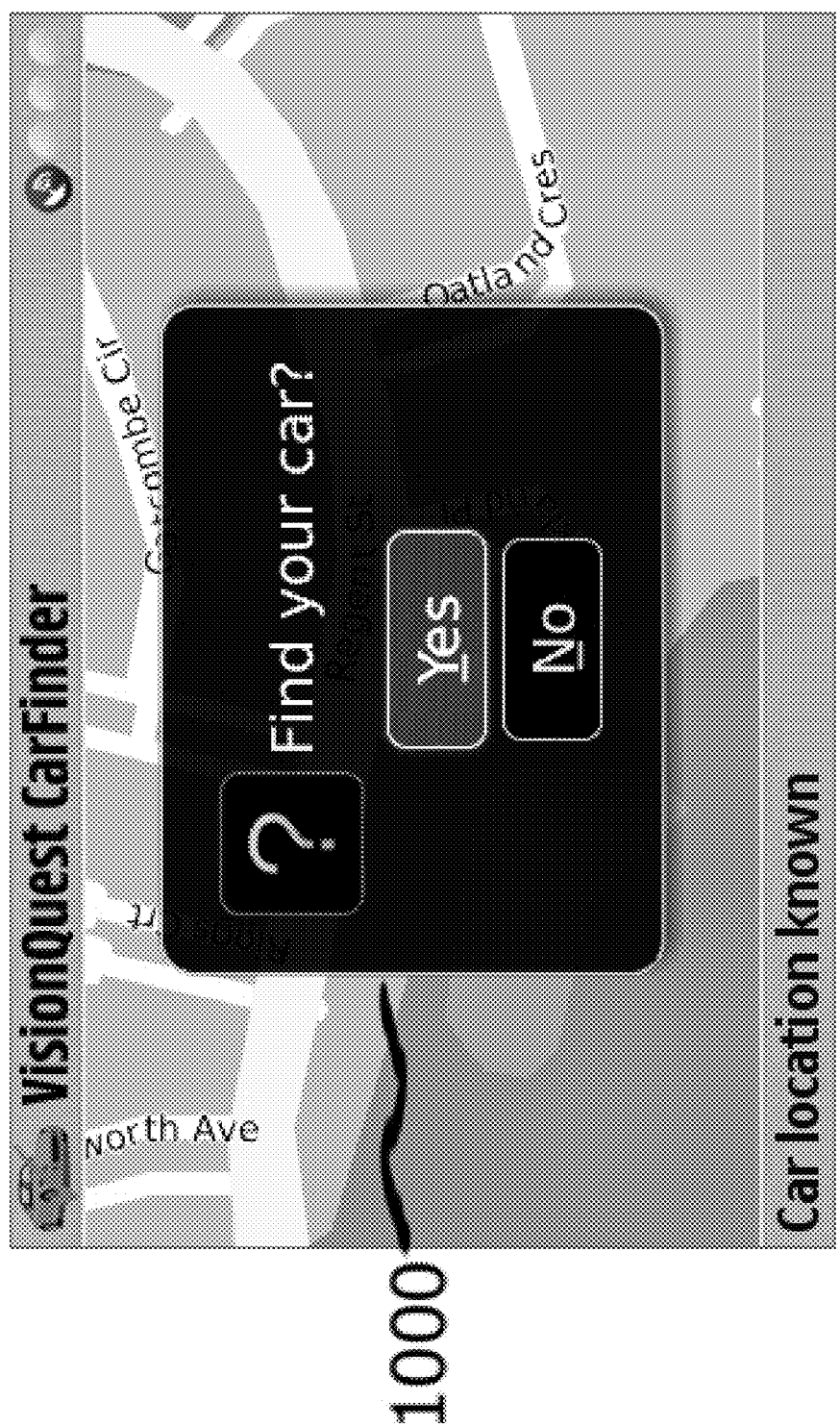
FIG. 10 is a screen capture off a locator device for the alternative embodiment which depicts the locator device prompting the user to report as to whether they can see their vehicle.

In FIG. 10, when a second trigger event occurs to denote that the user has returned to the approximate location of their vehicle, the user is presented with a prompt 1000 asking if he sees his vehicle.

Figure 11:
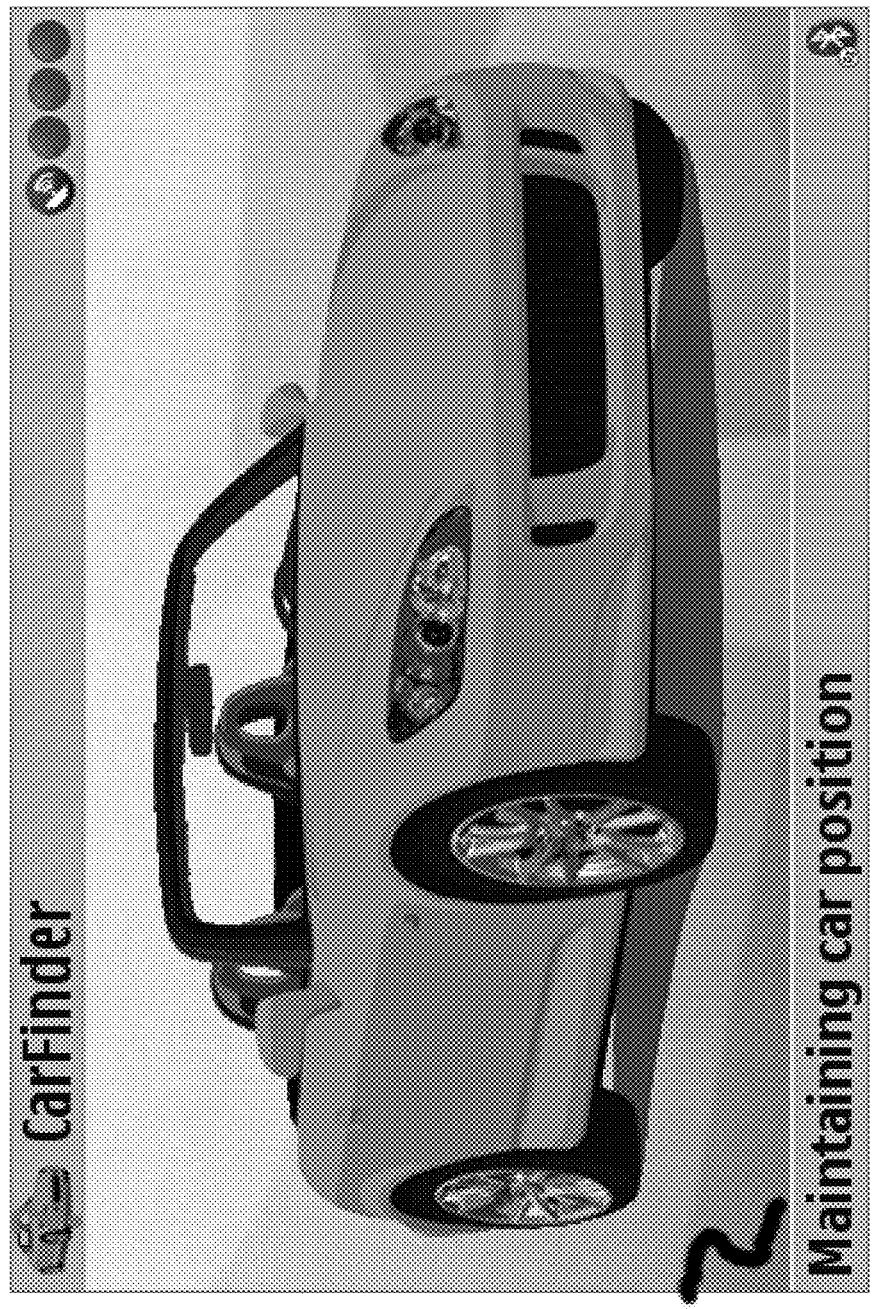
FIG. 11 is a screen capture off a locator device that depicts the locator device resetting after a trigger event.

FIG. 11 shows a screen 1100 that is presented to the user when the locator device 20 resets.

Example 1

Figure 12:
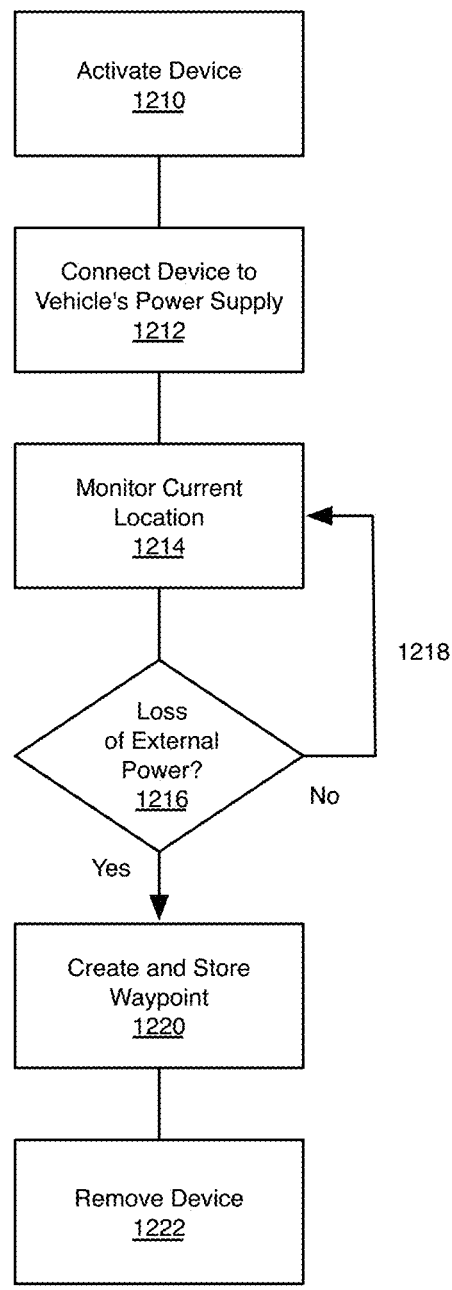
FIG. 12 is a flowchart showing the process for establishing a waypoint approximating a vehicle's location according to an embodiment of the present invention.

In one embodiment of the present invention a locator device 20, such as a portable GPS mapping device, is placed within a vehicle and coupled to the vehicle's power supply. The locator device is designed such that it can be easily removed from the vehicle by the user and later used to guide the user back to the stored waypoint representing the approximate location of the vehicle. The process for using the locator device is shown via flowchart in FIG. 12.

Operationally, if the locator device 20 is not already on, then the user turns it on (step 1210). The user connects the locator device 20 to the vehicle using the locator device's existing external power input port (step 1212). The order of steps 1210 and 1212 is interchangeable, depending on the nature of the device and the user's preferences. The locator device 20 automatically senses the connection of an external power source. The locator device 20 then monitors its current location on a regular basis (step 1214) using GPS signals or similar location systems. The locator device 20 also monitors (step 1216) for the cessation of the connection to the external power source. As long as the power source remains connected (step 1218), the locator device 20 continues to determine its current location.

The cessation of the external power source is readily sensed by units such as portable GPS units and cell phones as these devices can automatically determine that they are no longer being powered by an external source (in this case being the vehicle). This loss of an external power source serves as the triggering event for the locator device as described in FIG. 2. Thus, when the external power source connection is terminated, the locator device stores the last recorded GPS coordinates as a waypoint (step 1220), serving as a proxy for the location of the parked vehicle. The driver then removes the locator device 20 (step 1222) when exiting the vehicle and is able to later use the stored waypoint on the locator device 20 to return to the parked vehicle as described in FIG. 3, with the connecting of the locator device 20 to the vehicle's power supply serving as the trigger event to reset the locator device 20.

As an additional feature, the locator device 20 can emit an audible tone and/or provide a text message to confirm that the waypoint was recorded. An audible tone can also provide a reminder for the user to take the locator device from the vehicle.

In some vehicles, the vehicle ceases to provide power to its external power ports when the vehicle is turned off. In these instances, the locating device 20 will lose external power from the vehicle when the vehicle is turned off. This loss of external power serves as the triggering event. However, some vehicles continue to supply power to external devices even when the user has removed the key from the ignition. In that case, the locator device 20 must be physically disconnected to register the cessation of an external power supply and the disconnection will act as the triggering event.

Alternatively, the location can be stored in response to a triggering event from the user or user's vehicle, such as manual activation by the user on the locator device 20, by a voice command from the user, the engine being shut off, the door locks being disengaged, or the transmission being set to "Park", the last three representing the type of event that results in the vehicle terminating the external power source.

By storing the location on the locator device 20, the need for the user to carry a second device, such as a key fob, is eliminated. Additionally, there is no need to modify the vehicle to provide a signal to the locator device 20, although minor modifications to produce the triggering event may be desirable for the purpose of the alternative embodiments detailed above. Lastly, as there is no communication with a second device required, there is no transmission of information that can be degraded, corrupted, or possibly stolen.

Another advantage gained is that the removable locator device 20 is expected to have a larger display and greater functionality than a key fob or similar device, making it easier for the driver to view the navigational instructions to return to the vehicle and taking into account the current challenges of incorporating global positioning system technology into a device small enough to be placed on a key chain. The larger size also enables additional features, such as a combined text and map display, which would likely not be clearly visible on a smaller device.

A further advantage gained is that, unlike prior art devices, such as those disclosed by Wilkinson and Ayed, by initiating the global positioning or other locating system when the user first connects the locator device 20 to the vehicle's power source, the locator device 20 can reasonably be expected to have sufficient time to interact with the global positioning or other locating system prior to the user parking their vehicle and thus be able to secure a waypoint that, with reasonable accuracy, represents the current location when the user parks their vehicle.

Example 2

Another embodiment of the inventive system and method presented herein comprises using a short-range beacon device 10 which is placed in the vehicle, and which incorporates short-range wireless communications technology, such as Class 2 Bluetooth communications functionality. This beacon device 10 is detectable by a locator device 20 when the locator device 20 is within signal range of the beacon device 10. Using Bluetooth, for example, the beacon device's signal range would be approximately 10 meters, subject to the power and sensitivity of the transmitting and receiving devices, and reductions from interference and blockage. The locator device 20 is user-portable and preferably a cellular phone or GPS mapping device. The process for using the locator device 20 is shown via flowchart in FIG. 13.

Figure 13:
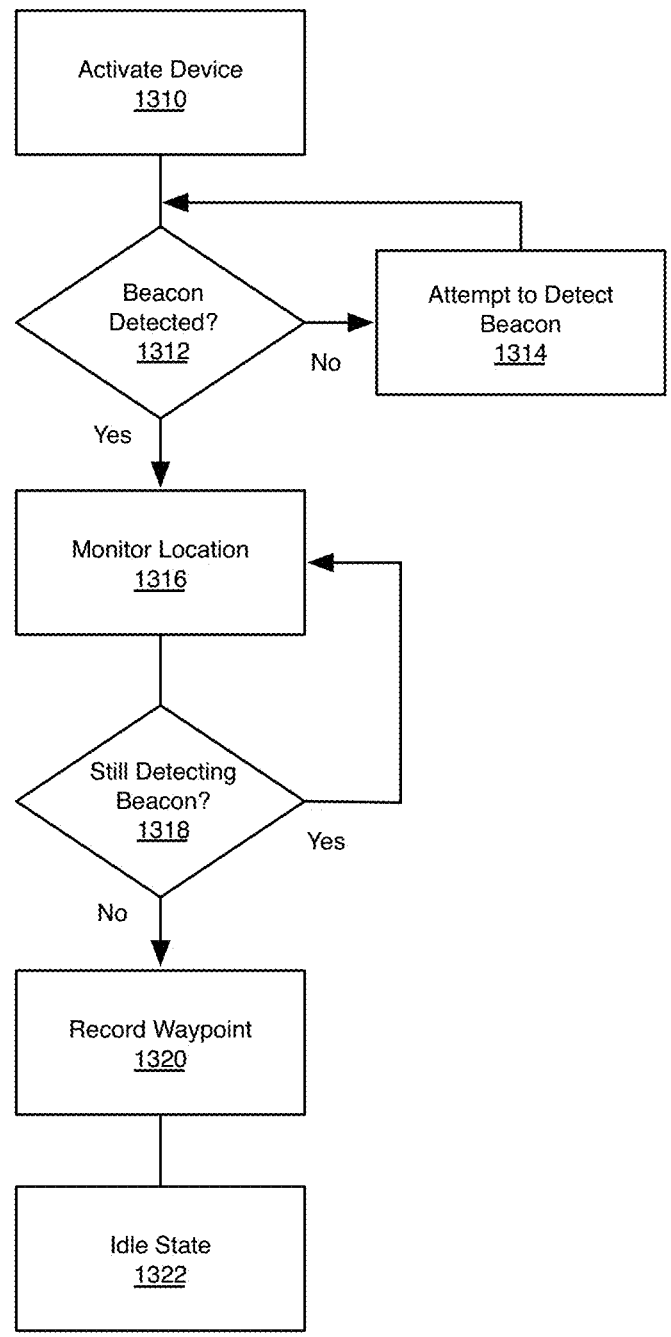
FIG. 13 is a flowchart showing the process for establishing a waypoint approximating a vehicle's location according to an alternative embodiment of the present invention.

In operation, as shown in FIG. 13, if the locator device 20 is not already on, then the user turns it on (step 1310), at which point the application automatically launches in the background. The locator device 20 continuously attempts to detect the signal from the beacon device 10 (step 1312), and then attempts to establish a Bluetooth piconet with the beacon device 10, according to Bluetooth protocols for establishing connections between Bluetooth-enabled devices. If the beacon is not detected, the locator device will idle (step 1314) for a pre-set time period before attempting to detect the beacon device 10 again (step 1312). The beacon signal can be emitted continuously, or at regular intervals, preferably of less than 60 seconds.

Once the beacon device 10 is detected by the locator device 20, the locator device 20 automatically initiates and uses its locating technology (e.g. GPS) to monitor its current location (step 1316). The locator device 20 then repeats the process of detecting the signal from the beacon device 10. Once the beacon signal is detected, the locator device then (step 1318) returns to monitoring its current location and repeats the process. Thus, as long as the locator device 20 continues to detect the signal from the beacon device 10, the locator device 20 regularly updates its current location as the approximate location of the vehicle.

When the locator device 20 no longer detects the beacon device 10, most likely because the locator device 20 has been moved out of range of the beacon device 10 by the user after he or she parks and walks away from his or her vehicle, the locator device 20 automatically records the last monitored coordinates as a waypoint (step 1320) and enters an idle state (step 1322) until activated by the user. Thus, the locator device can then be used to return to recorded waypoint, which will approximate the location where the vehicle is parked. The driver is able to later use the stored waypoint on the locator device 20 to return to the parked vehicle as described in FIG. 3, with the user returning to the vehicle and bringing the locator device 20 back into range of the beacon device 10 serving as the trigger event to reset the locator device 20.

As depicted in FIG. 10, when the user brings the locator device 20 back into range of the beacon device 10, a text box appears on the locator device screen indicating text to the effect of "Do you see your car?" (step 1000). If the user selects "Yes", then the locator device resets and returns to Maintaining Car Position mode (as described above in FIG. 11). If the user selects "No", then the locator device continues to display the user's current position and the car icon depicting the waypoint that approximates the location of the vehicle. If the user stays in range of the beacon device 10 for a period of time (e.g. an additional 15 seconds), the locator device 20 prompts them with the above question again. This cycle continues until the user selects "Yes" or until the locator device 20 notes that (1) it is in range of the beacon device 10 and (2) that the locator device 20 is moving at a rate consistent with a vehicle in motion. At this point the locator device 20 "assumes" that the user has entered the vehicle and has forgotten to press "Yes", and reverts to Maintaining Car Position mode (as described in FIG. 11).

As an additional feature, the locator device 20 can emit an audible tone and/or provide a text message to confirm that the waypoint was recorded. An audible tone can also provide a reminder for the user to take the locator device 20 from the vehicle.

The beacon device 10 is effectively a 'dumb' device, merely allowing the locator device to detect it according to preset parameters. By structuring the beacon device 10 in this fashion, several advantages are gained. First, the work required to detect loss of signal (i.e. that the car is parked and the user has left the vehicle) and record the waypoint is passed on to the locator device, thus likely making the beacon device less expensive to manufacture and less likely to malfunction. Second, by operating on the basis of the presence or absence of the beacon signal, the need to actually detect the car parking or a similar event is eliminated, reducing the probability of failure to record the waypoint at the appropriate time.

The beacon device 10 can be battery-powered, self-powered by other means (e.g. solar cells), adapted to plug into a power source (i.e. cigarette lighter or power socket) in the vehicle, or permanently affixed to and powered by the vehicle.

Bluetooth is preferred for the wireless communication between the beacon device 10 and the locator device 20, as the signal range is low enough to provide activation near the vehicle's location, while also providing encryption such that a particular beacon can be associated with a particular locator device, thus preventing interference and false signals from other beacons during normal use.

As an alternative to initial beacon detection step 1312, the locator device 20 can be user-activated, eliminating the need for the initial detection of the beacon. However, user activation creates the potential for the user to fail to activate the locator device 20, which is avoided by automatic activation.

INDUSTRIAL APPLICABILITY

By storing the location on the locator device 20, the need for the user to carry a second device for the sole purpose of locating their vehicle, such as a key fob, is eliminated. Additionally, there is no need to modify the vehicle to provide a signal to the locator device 20, although minor modifications to produce the triggering event may be desirable for the purpose of the alternative embodiments detailed above. Lastly, as there is no communication with a second device required, there is no transmission of information that can be degraded, corrupted, or possibly stolen.

Another advantage gained is that the removable locator device 20 is expected to have a larger display and greater functionality than a key fob or similar device, making it easier for the driver to view the navigational instructions to return to the vehicle and taking into account the current challenges of incorporating global positioning system technology into a device small enough to be placed on a key chain. The larger size also enables additional features, such as a combined text and map display, which would likely not be clearly visible on a smaller device A further advantage gained is that, unlike prior art devices, such as those disclosed by Wilkinson and Ayed, by initiating the global positioning system when the user first connects the locator device 20 to the vehicle's power source (or, in the alternate embodiment, when the locator device 20 first enters the range of the beacon device 10), the locator device 20 can reasonably be expected to have sufficient time to interact with the global positioning system prior to the user parking their vehicle and thus be able to secure a waypoint that, with reasonable accuracy, represents the current location when the user parks their vehicle.

There is the possibility that the user is able to find and return to their vehicle without the need to refer to the locator device 20 and to the stored waypoint therein. As the steps to record the waypoint are preferably fully automated "(noting connection to external power or noting that device has entered range of beacon, launching GPS, monitoring position, recording a waypoint), they will continue to take place (unless user has deactivated the locator device 20) and this process is unaffected by the user's decision.

However, if the user elects to not use the locator device 20 to help them return to their vehicle, then the method to return to the vehicle, which must be initiated by user, no longer takes place. However, the locator device 20 still needs to reset to start tracking location again when user gets back into their vehicle and moves on to their next destination.

Considering Example 1, when the user reconnects the locator device 20 to the vehicle's power supply then the locator device 20 automatically resets, regardless of whether the user activated the locator device 20 to return to the vehicle. As such, the user electing to not use the locator device does not have any implications in this context for the embodiment described in Example 1.

Considering Example 2, the locator device 20 notes when it is back in range of beacon device 10. If locator device 20 stays in range of beacon device 10 for an extended period of time (e.g. in excess of 60 seconds) then the locator device assumes that the vehicle is back in motion and the locator device 20 automatically resets as previously described.

While the above examples have been presented in the context of locating parked passenger vehicles, particularly automobiles, the device method is equally applicable to other vehicles (e.g. transport trucks, boats, motorcycles, bicycles) that are parked by a driver at a location that must be returned to at a later time.

This concludes the description of presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A computer-implemented method for locating a parked vehicle, comprising:
   communicating, by a mobile device, with a wireless beacon associated with a beacon location;
   periodically retrieving current location coordinates, via a GPS receiver, for the current location of said GPS receiver and relaying the current location coordinates to said mobile device;
   storing in a computer-readable medium, associated with said mobile device, the current location coordinates as the beacon location upon either losing connection to the wireless beacon or detecting, via said mobile device, a loss of power to said mobile device from a power supply of said vehicle; and
   displaying an indicator on a display pointing in the direction of the beacon location from the current location.

2. The method of claim 1, further comprising:
   presenting directions to said parked vehicle via said GPS receiver.

3. The computer-implemented method for navigating according to claim 1, wherein the mobile device loses connection to the wireless beacon at a distance greater than 10 meters.

4. The computer-implemented method for navigating according to claim 1, wherein the mobile device loses connection to the wireless beacon when the wireless beacon is no longer supplied with power.

5. The computer-implemented method for navigating according to claim 1, wherein the mobile device communicates with the wireless beacon on a periodic basis.

6. The computer-implemented method for navigating according to claim 1, wherein the wireless beacon communicates via Bluetooth.

7. The computer-implemented method for navigating according to claim 1, further comprising displaying a map on the display.

8. The computer-implemented method for navigating according to claim 7 wherein detecting when the distance between the beacon location and the current location is less than 100 meters; and enabling displaying of the map on the display.

9. The computer-implemented method for navigating according to claim 7, further comprising displaying on the display a highlighted route on the map from the current location to the beacon location.

10. The computer-implemented method for navigating according to claim 1, further comprising providing spoken instructions over at least one speaker to guide the mobile device from the current location to the beacon location.

11. The computer-implemented method for navigating according to claim 1, further comprising presenting on the display a prompt upon reconnection of the mobile device with the wireless beacon.

12. The computer-implemented method for navigating according to claim 1, wherein the wireless beacon is powered by a vehicle.

13. A system for navigating a mobile device to a beacon location, comprising:
   a wireless beacon associated the beacon location and in communication with the mobile device;
   a GPS receiver periodically providing a current location to the mobile device;

the mobile device storing in a computer-readable medium the current location as the beacon location upon either losing connection to the wireless beacon or detecting a loss of power to said mobile device; and a display presenting an indicator pointing in a direction of the beacon location from the current location.

14. The system for navigating according to claim 13, wherein the mobile device loses connection to the wireless beacon at a distance greater than 10 meters.

15. The system for navigating according to claim 13, wherein the mobile device loses connection to the wireless beacon when the wireless beacon is no longer supplied with power.

16. The system for navigating according to claim 13, wherein the mobile device communicates with the wireless beacon on a periodic basis.

17. The system for navigating according to claim 13, wherein the wireless beacon communicates via Bluetooth.

18. The system for navigating according to claim 13, further comprising the display presenting a map.

19. The system for navigating according to claim 18, wherein the map is presented when the distance between the beacon location and the current location is less than 100 meters.

20. The system for navigating according to claim 19, further comprising the display highlighting a route on the map from the current location to the beacon location.

21. The system for navigating according to claim 13, further comprising at least one speaker providing spoken instructions to guide the mobile device from the current location to the beacon location.

22. The system for navigating according to claim 13, further comprising the display presenting a prompt upon reconnection of the mobile device with the wireless beacon.

23. The system for navigating according to claim 13, wherein the wireless beacon is powered by a vehicle.

24. The system for navigating according to claim 13, wherein the GPS receiver is within the mobile device.

\* \* \* \* \*